US012021755B2

(12) United States Patent
Sesha

(10) Patent No.: US 12,021,755 B2
(45) Date of Patent: Jun. 25, 2024

(54) CLASSIFICATION AND FORWARDING OF NETWORK TRAFFIC FLOWS

(71) Applicant: Hewlett Packard Enterprise Development LP, Houston, TX (US)

(72) Inventor: Madhusoodhana Chari Sesha, Karnataka (IN)

(73) Assignee: Hewlett Packard Enterprise Development LP, Spring., TX (US)

( * ) Notice: Subject to any disclaimer, the term of this patent is extended or adjusted under 35 U.S.C. 154(b) by 0 days.

(21) Appl. No.: 17/661,088

(22) Filed: Apr. 28, 2022

(65) Prior Publication Data

US 2023/0246971 A1     Aug. 3, 2023

(30) Foreign Application Priority Data

Jan. 28, 2022    (IN) .............................. 202241004884

(51) Int. Cl.
| | | |
|---|---|---|
| *H04L 47/2441* | (2022.01) | |
| *G06N 5/022* | (2023.01) | |
| *H04L 9/40* | (2022.01) | |
| *H04L 41/16* | (2022.01) | |
| *H04L 43/16* | (2022.01) | |
| *H04L 47/80* | (2022.01) | |

(52) U.S. Cl.
CPC ......... *H04L 47/2441* (2013.01); *G06N 5/022* (2013.01); *H04L 41/16* (2013.01); *H04L 43/16* (2013.01); *H04L 47/805* (2013.01); *H04L 63/0236* (2013.01); *H04L 63/1425* (2013.01)

(58) Field of Classification Search
CPC ..... H04L 47/2441; H04L 41/16; H04L 43/16; G06N 5/022
See application file for complete search history.

(56) References Cited

U.S. PATENT DOCUMENTS

| | | | |
|---|---|---|---|
| 9,191,468 B2* | 11/2015 | Suarez Fuentes | .... H04L 67/306 |
| 2015/0124826 A1 | 5/2015 | Edsall et al. | |
| 2017/0048144 A1 | 2/2017 | Liu | |
| 2017/0339187 A1* | 11/2017 | Papamartzivanos | ... G06N 3/126 |
| 2018/0082172 A1* | 3/2018 | Patel | ......... G06N 3/08 |
| 2018/0191609 A1 | 7/2018 | Caulfield et al. | |
| 2022/0141139 A1* | 5/2022 | Wong | ................. H04L 41/5003 709/223 |
| 2022/0191145 A1* | 6/2022 | Duraj | ..................... H04L 47/29 |

* cited by examiner

*Primary Examiner* — Adnan M Mirza
(74) *Attorney, Agent, or Firm* — Hewlett Packard Enterprise Patent Department

(57) ABSTRACT

Examples described herein relate to selectively forwarding traffic flows based on traffic flow classification. Examples include classifying a traffic flow into a first traffic class by a first machine learning (ML) model based on flow characteristics of the traffic flow. A second traffic class is determined based on a deviation between the flow characteristics of the traffic flow and average flow characteristics of each of the plurality of traffic classes. A quality metric for the first ML model is updated based on whether the first traffic class and the second traffic class match. The traffic flow is selectively forwarded based on the quality metric.

18 Claims, 7 Drawing Sheets

| QUALITY METRIC 620 | FLAG 621 | TRAFFIC CLASS 622 | SOURCE 623 | DESTINATION 624 | RULE 625 |
|---|---|---|---|---|---|
| 1 | TRUE | RES NON-INTENSIVE | ANY | ANY | PERMIT |
| 1 | TRUE | RES INTENSIVE | ANY | XXX.XXX.XXX.1 | REROUTE |
| 1 | TRUE | MALICIOUS | XXX.XXX.XXX.2 | ANY | DENY |
| 1 | TRUE | NON-MALICIOUS | ANY | ANY | PRIORITIZE |
| 1 | FALSE | ANY | ANY | ANY | NOTIFY |
| 0 | TRUE | ANY | ANY | ANY | NOTIFY |
| 0 | FALSE | ANY | ANY | ANY | NOTIFY |

CLASSIFICATION AND FORWARDING OF NETWORK TRAFFIC FLOWS

BACKGROUND

In software-defined networks, a network controller can instruct switches or routers to forward or route traffic flows along a routing path. A traffic flow refers to a sequence of data packets that have common attributes, such as source and destination addresses, protocol type, source and destination ports, etc. The routing path for each traffic flow is selected by the network controller, an administrator, or another entity, based on a type of the traffic flow.

Each type of traffic flow in a network has different flow-specific requirements, such as resources (e.g., bandwidth) or quality of service, authentication, security, etc. For example, a traffic flow related to a database application may be subject to a higher quality of service in comparison to a traffic flow related to a social media application. Further, the traffic flow related to the database application may be subject to authentication (e.g., via passwords), role-based limitations (e.g., only the data engineering department has access to traffic flows related to the database application), or other preferences.

Often, the traffic flows are classified at an observable point in the network to fulfill the flow-specific requirements. For example, a network device (e.g., a switch or a router) may be configured to classify a multitude of traffic flows into traffic classes using machine learning (ML) techniques. Such classification of the traffic flows enables an administrator to monitor network traffic and analyze the performance of applications to make critical decisions, such as allocating resources (e.g., bandwidth) at network device(s), filtering traffic flows, or the like.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 6 is an example access control list to selectively forward traffic flows.

Figure 1:
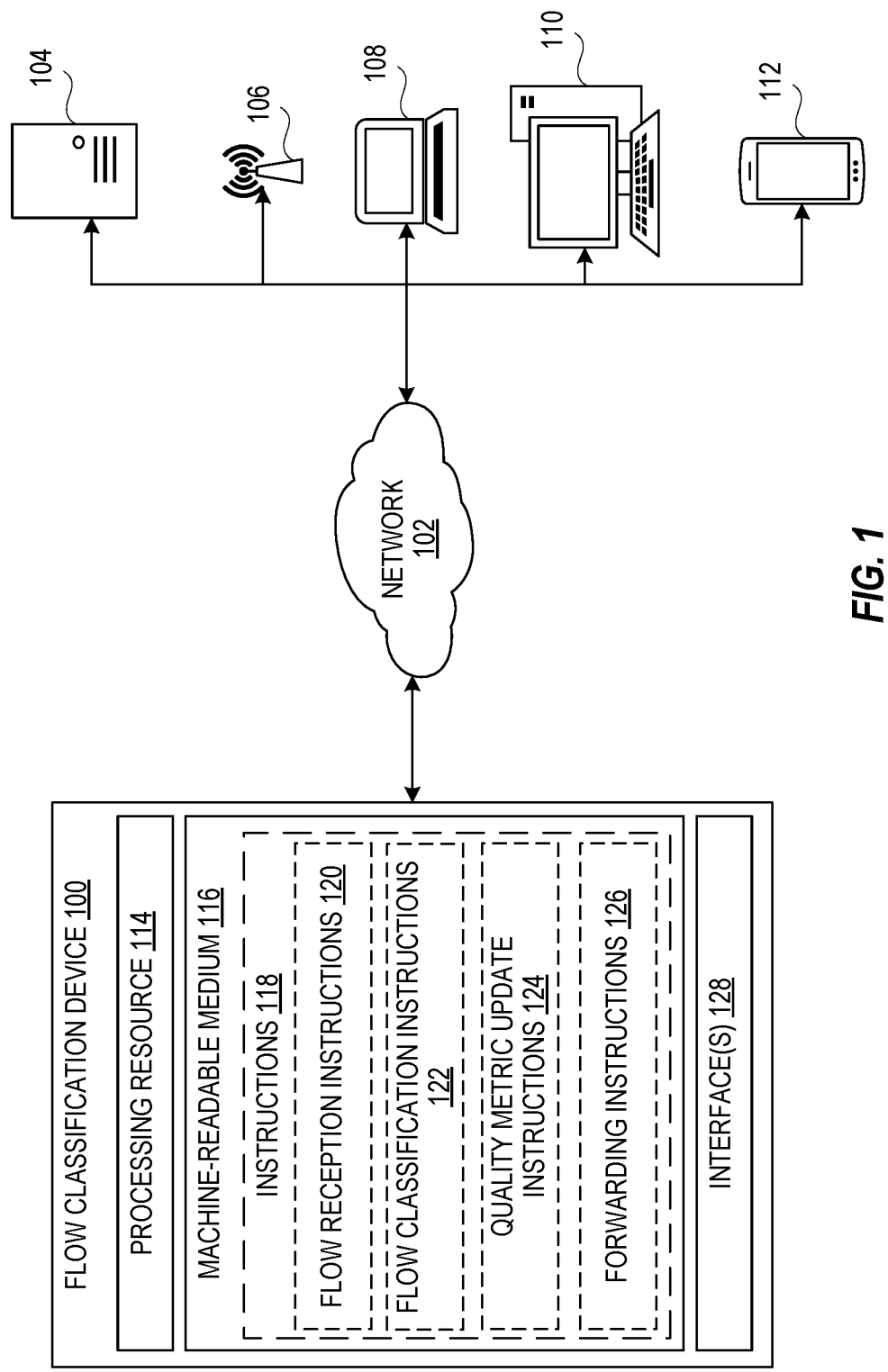
FIG. 1 illustrates an example device that selectively forwards traffic flow based on traffic flow classification.

Certain examples have features that are in addition to or in lieu of the features illustrated in the above-referenced figures. Certain labels may be omitted from certain figures for the sake of clarity.

DETAILED DESCRIPTION

Often, a machine learning (ML) model deployed at a network device (e.g., a switch, a router, a gateway, a server, etc.) classifies traffic flows into different traffic classes based on the type of service or application associated with the traffic flows. For example, a supervised ML model may classify a traffic flow into a database application flow, social media application flow, or the like. In some solutions, the ML model classifies the traffic flows into more granular traffic classes. For example, the traffic flows may be classified based on resource consumption (e.g., resource intensive or resource non-intensive), security threats (e.g., malicious or non-malicious), etc.

However, ML models do not consistently perform accurate classification of the traffic flows, and misclassifications are bound to occur. The misclassifications may pose a security threat to networks or lead to sub-optimal resource allocation. For instance, an ML model may incorrectly classify an unknown traffic flow (e.g., a malicious flow) into a known traffic class (e.g., non-malicious flow). In such instances, malicious traffic flows may go undetected and forwarded to other devices, which may get compromised. In another instance, the ML model may incorrectly classify a resource intensive traffic flow (i.e., a flow that requires a large bandwidth for transmission) as a resource non-intensive flow (i.e., a flow that does not require large bandwidth for transmission). In such instances, the transmission of the traffic flow may be delayed due to insufficient bandwidth at destination device(s).

In examples consistent with this disclosure, traffic flows are independently classified using two or more ML models and are forwarded based on a comparison of the classification results of the ML models relative to each other. In some examples, a first ML model classifies a given traffic flow into a traffic class according to flow characteristics of the traffic flow, while a second ML model classifies the traffic flow based on a similarity between the flow characteristics of the traffic flow and average flow characteristics of each traffic class. A performance of the first ML model is quantified using a quality metric, which indicates a number of times the classification results of the first ML model and the second ML model match. After classification of the given traffic flow, the quality metric is recomputed based on whether classification results of the first ML model and that of the second ML model match. The traffic flow is selectively forwarded over the network according to the quality metric for the first ML model.

The value of the quality metric is compared with a range of threshold values to determine whether the classification results of the first and second ML models match a sufficient number of times. In some examples, if the quality metric is in the range of threshold values and the classification results match, then the traffic flow is forwarded to an intended destination device. In such examples, additional traffic filtering rules can be applied to selectively forward the traffic flow according to the classification result by the first ML model. For instance, if the classification result is a resource intensive flow or a malicious flow, then the traffic flow may be rerouted or blocked, respectively.

In another example, if the quality metric is in the range of threshold values and if the classification results do not match, a notification indicative of a potential misclassification by the first ML model is transmitted to an administrator. In other examples, if the quality metric is not in the range of threshold values (i.e., insufficient number of matches between the classification results of the first and second ML models), then a notification indicative of a poor performance of the first ML model is transmitted to an administrator. The administrator may perform suitable actions, such as fine-tuning or retraining the first ML model to classify new traffic flows.

Examples of this disclosure improve the technical field of network management, specifically in the subfield of classifying traffic flows in a network. The technical improvements are achieved in switches, routers, servers, or any device configured to classify the traffic flows. Examples of this disclosure apply mathematical concepts of computation of quality metric for the ML model within the technical context of classification and selective forwarding of the traffic flows. Examples of this disclosure detect potential misclassifications, evaluate the performance of the ML model, and configure access control lists to selectively apply forwarding rules on the traffic flows.

FIG. 1 illustrates an example flow classification device 100 that selectively forwards traffic flows based on traffic flow classification. The flow classification device 100 is in communication with devices 104-112 over a network 102 deployed at a site, such as a building, a campus, or the like. The devices 104-112 include one or more of servers 104, access points 106, laptops 108, computers 110, mobile devices 112, or the like. Each of the devices is capable of transmitting, receiving, and forwarding data to any of the other devices connected to the network 102. The devices communicate the data as collections of data packets or traffic flows. A traffic flow is a sequence of data packets carrying information between two or more devices. In a traffic flow, each data packet includes a data segment or a payload (i.e., user information) and some common attributes, such as source and destination addresses, protocol type, type of service, quality of service (QoS), timestamps, or other details for delivering the payload.

In examples described herein, the flow classification device 100 operates as an observable point of the traffic flows received from or transmitted to the devices 104-112 in the network 102. For example, the flow classification device 100 may be a switch, a router, a gateway, a server, or the like, that forwards the traffic flows from a source device to a destination device in the network 102. The flow classification device 100 includes at least one processing resource 114 and at least one machine-readable medium 116 storing (e.g., encoded with) instructions 118. The instructions 118 include at least flow reception instructions 120, flow classification instructions 122, quality metric update instructions 124, and forwarding instructions 126. The flow classification device 100 includes one or more interface(s) 128, such as a network interface (e.g., network interface card, network port, etc.) to receive traffic flows from the devices 104-112 connected to the network 102. The processing resource 114 executes the instructions 118 stored in the machine-readable medium 116 to classify the received traffic flows and selectively forward the traffic flows based on the classification.

The processing resource 114 executes the flow reception instructions 120 to receive traffic flows from one or more of the device(s) 104-112 in the network 102 or from an external network (not shown in FIG. 1). The traffic flows include data packets communicated between the devices 104-112 or devices external to the network 102 via the flow classification device 100. For example, the client devices, such as laptop 108, computer 110, mobile device 112, or the like, transmit the traffic flows to the server 104 or vice-versa via the flow classification device 100. Alternatively, the devices 104-112 transmit traffic flows to remote servers (not shown in FIG. 1) external to the network 102 as outbound traffic flows or receive traffic flows from the remote servers as inbound traffic flows.

The processing resource 114 executes the flow classification instructions 122 to classify the received traffic flows. The flow classification instructions 122 classify each traffic flow into a traffic class from a plurality of traffic classes based on flow characteristics using a first machine learning (ML) model. The flow characteristics include the properties or attributes of the data packets of the traffic flow. The traffic class predicted by the first ML model is referred to herein as "first traffic class". Examples of the traffic classes may include one or more of resource intensive flow, resource non-intensive flow, malicious flow, non-malicious flow, or the like.

Further, the processing resource 114 executes the flow classification instructions 122 to determine a second traffic class, which may be the same or different from the first traffic class, for each traffic flow. The flow classification instructions 122 determine the second traffic class based on a deviation (e.g., a difference) between the flow characteristics of a given traffic flow and average flow characteristics of each of the traffic classes. The average flow characteristics (referred to herein as a centroid) of a traffic class refers to a mean value, a weighted average value, or a median value of the flow characteristics of the traffic flows that were previously classified into that traffic class. For example, the average flow characteristics or centroid of a traffic class, such as resource intensive flows, may be the average value of the packet length data, packet arrival time, number of packets, number of bytes, or the like, of each traffic flow already classified in that traffic class.

Among the centroids of each traffic class, the centroid having a least deviation from the flow characteristics of a given traffic flow is identified. The deviation is indicative of differences in the flow characteristics between the centroids of each traffic class and the traffic flow. For example, the deviation may be a set of values corresponding to the differences between the packet length values, packet arrival time values, number of packets, number of bytes, etc., of the given traffic flow and that of the centroid of each traffic class. The set containing the smallest values may correspond to the least deviation between the flow characteristics and the average flow characteristics. The traffic class that contains the centroid having the least deviation from the flow characteristics of the traffic flow is identified as the second traffic class.

The processing resource 114 executes the quality metric update instructions 124 to compute and update a quality metric for the first ML model. The quality metric is a measure of a quality, i.e., frequency of matches between classifications predicted by the first ML model and the second ML model for the traffic flows received at the flow classification device 100. In some examples, the quality metric is a ratio of frequency of match between the first traffic class and the second traffic class to the sum of frequencies of match and mismatch between the first and second traffic classes. Example equation 1 representing the quality metric is provided below, where $f_{match}$ and $f_{mismatch}$ represent the frequency of match and frequency of mismatch between the first and second traffic classes.

$$\text{Quality metric} = \frac{f_{match}}{f_{match} + f_{mismatch}} \quad (1)$$

After the classification of the traffic flow performed by the flow classification instructions 122, the quality metric update instructions 124 determine whether the first traffic class predicted by the first ML model and the second traffic class match, and update the quality metric based on the determination. For example, if the first and the second traffic classes match (i.e., are the same), then the quality metric update instructions 124 increment $f_{match}$ by 1, in the example equation (1), thereby increasing the quality metric. Further, if the first and the second traffic class do not match (i.e., are not the same), then the quality metric update instructions increment $f_{mismatch}$ by 1, in the example equation (1), thereby decreasing the quality metric, for example.

The processing resource 114 executes the forwarding instructions 126 to selectively forward the traffic flows based on the quality metric for the first ML model. To selectively forward the traffic flows, the forwarding instructions 126 determine if the quality metric is in a range of threshold values (e.g., greater than 95%), which corresponds to a desired frequency of matches between first and second traffic classes. The forwarding instructions 126 also check whether the first traffic class and the second traffic class match for the received traffic flow. If the quality metric is in the range of threshold values and the first and second traffic classes match, then the forwarding instructions 126 forward the traffic flow to a destination address as indicated in the flow characteristics of that traffic flow.

The forwarding instructions 126 perform other actions if the quality metric is not in the range of threshold values (e.g., is not greater than 95%) or if the first and second traffic classes do not match. For example, if the quality metric is not greater than 95%, then the forwarding instructions 126 send a notification to an administration device (e.g., operated by an administrator) indicating that the frequency of matches between first and second traffic classes is not satisfactory. Further, if the first and second traffic classes do not match, then the forwarding instructions 126 send a notification to the administration device to fine-tune the first ML model or take preventive measures, such as temporarily pausing or rerouting the traffic flows received at the flow classification device 100, for example.

Figure 2:
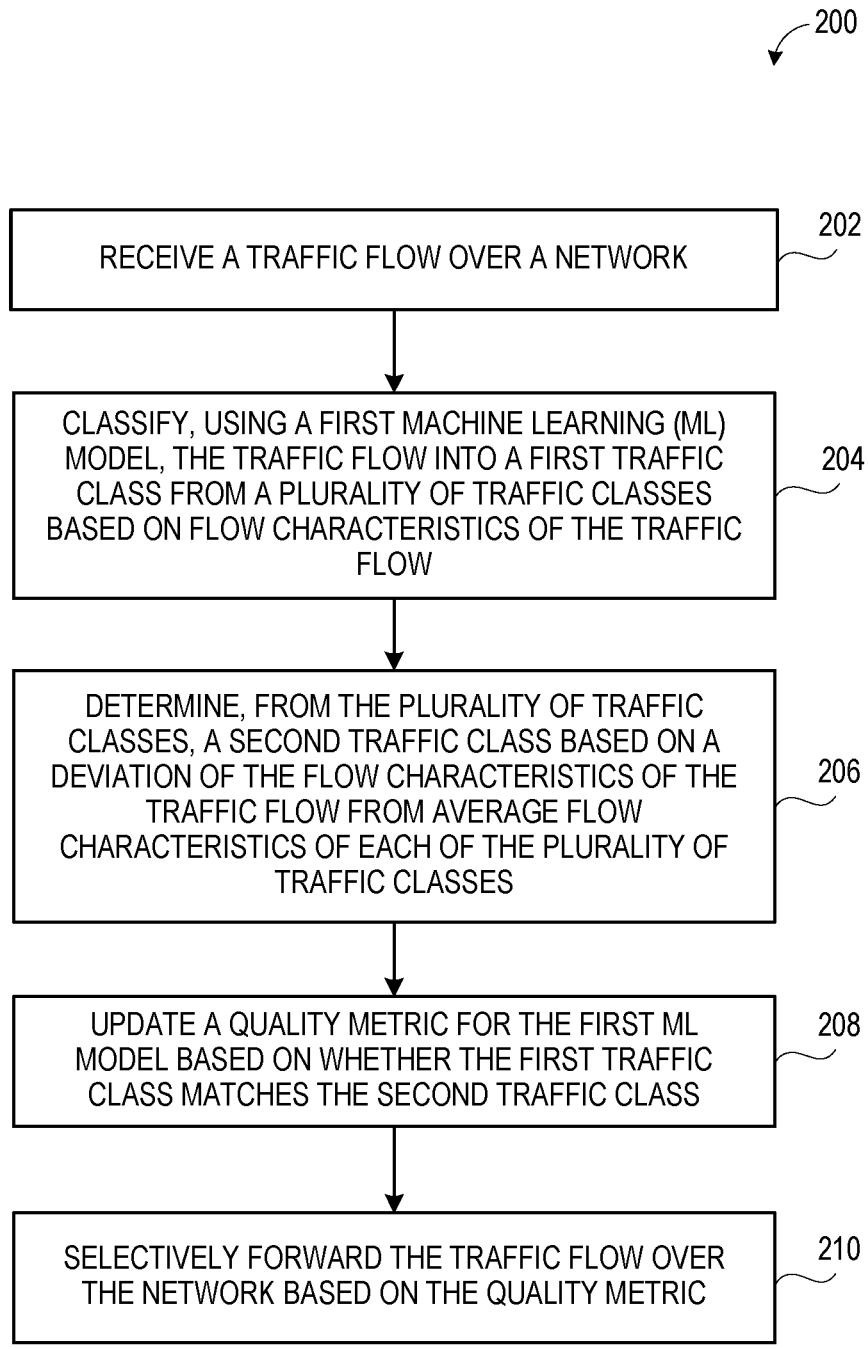
FIG. 2 is a flowchart of an example method to selectively forward a traffic flow based on traffic flow classification.

FIG. 2 is a flowchart illustrating an example method 200 to selectively forward traffic flows based on traffic flow classification. In some examples, the method 200 may be encoded as instructions in a computer-readable medium and executed on a device (e.g., the flow classification device 100) of FIG. 1. Examples will now be described in relation to FIGS. 1 and 2.

At block 202, method 200 includes receiving a traffic flow from a device 104-112 in the network 102 or a device external to the network 102. The traffic flow includes data packets, which include a payload (i.e., user information) and some common properties, such as source and destination IP addresses, protocol type (e.g., Hypertext Transfer Protocol (HTTP), File Transfer Protocol (FTP), Hypertext Transfer Protocol Secure (HTTPS), etc.), type of service (e.g., email, video streaming, etc.), timestamps, packet length data, packet arrival time, number of packets, number of bytes, etc.

At block 204, method 200 includes classifying the traffic flow into a first traffic class from a plurality of traffic classes using a first ML model. The first ML model is trained to classify the traffic flow based on the flow characteristics of the traffic flow. In some examples, the first ML model may be a supervised learning method, which is trained using a labeled dataset. The labeled dataset includes features and labels. The features include the flow characteristics of historical traffic flows, and the labels include the plurality of traffic classes of the historical traffic flows. Examples of the plurality of traffic classes may include resource intensive flows, resource non-intensive flows, malicious flows, non-malicious flows, or the like.

At block 206, method 200 includes determining a second traffic class from the plurality of traffic classes based on deviation from centroids. A centroid of a traffic class represents the average flow characteristics of the traffic class. For example, in the labeled dataset, a centroid of a traffic class (e.g., resource intensive flows) is a sample traffic flow with the most common flow characteristics in that traffic class. In some examples, a second ML model determines the centroid for each traffic class. For example, the labeled dataset including flow characteristics and traffic classes of the historical traffic flows is inputted to the second ML model. The second ML model determines the most common flow characteristics in each traffic class. For example, the second ML model computes the average or median value of the source and destination addresses, protocol type, type of service, timestamps, packet length data, packet arrival time, number of packets or bytes, etc., of the sample traffic flows in each traffic class and identifies a sample traffic flow having similar or same values as the determined average values.

After determining the first traffic class for the traffic flow using the first ML model, the second ML model identifies the centroid, among the centroids of each traffic class, that has the least deviation from the received traffic flow. The deviation may indicate differences in the flow characteristics between the centroids of each traffic class and the traffic flow, for example. The traffic class containing the centroid with the least deviation from the traffic flow is identified as the second traffic class.

At block 208, method 200 includes updating a quality metric for the first ML model based on whether the first traffic class and the second traffic class match. The quality metric is a measure of a quality (e.g., accuracy) of the classifications predicted by the first ML model up to a particular point in time. In some examples, the quality metric is computed based on a frequency of the match and mismatch between the first and second traffic classes. For example, the quality metric may be a ratio of the frequency of matches between the first and second traffic classes and the sum of the frequency of match and frequency of mismatch of the first and second traffic class. Example equation 1 represents the quality metric for the ML model. In another example, the quality metric may be a ratio of the frequency of mismatches between the first and second traffic classes and the sum of the frequency of match and frequency of mismatch between the first and second traffic classes. An example equation (2) representing the quality metric is provided below, where $f_{match}$ and $f_{mismatch}$ represent the frequency of match and frequency of mismatch between the first and second traffic classes.

$$\text{Quality metric} = \frac{f_{mismatch}}{f_{match} + f_{mismatch}} \quad (2)$$

For the received traffic flow, if the first and the second traffic classes match (i.e., are the same), then $f_{match}$ is incremented by 1 and the quality metric decreases (using the equation (2)). For example, if the first traffic class is resource intensive flow and the second traffic class is also resource intensive flow, the quality metric is decreased. If the first and the second traffic classes do not match (i.e., are not the same), then $f_{mismatch}$ incremented by 1 and the quality metric mismatch is increases. For example, if the first traffic class is resource intensive flow and the second traffic class is a resource non-intensive flow, then the quality metric is increased.

At block 210, method 200 includes selectively forwarding the traffic flow over the network based on the quality metric for the first ML model. The quality metric is compared with a range of threshold values. The range of threshold values includes a range of values for a quality metric that corresponds to a desired frequency of match between the first traffic class and the second traffic class. For a given traffic flow, if the quality metric is in the range of threshold values (e.g., greater than 95%) and the first and second traffic class match, then the traffic flow is forwarded to a destination address indicated in the flow characteristics of that traffic flow.

In some examples, a notification is transmitted to an administration device if the quality metric is not in a range of threshold values (e.g., not greater than 95%). For example, if the quality metric is not greater than 95%, then the notification may indicate that the frequency of matches between the first and second traffic classes is not satisfactory. Further, if the first and second traffic classes do not match, then the notification may indicate a potential misclassification performed by the first ML model. The notification may also indicate a recommendation to fine-tune the first ML model or take preventive measures, such as temporarily pausing or rerouting traffic flows received at the flow classification device 100, for example.

In some examples, if the quality metric is in a range of threshold values and the first and second traffic classes are the same, then the traffic flow is selectively forwarded based on the first traffic class determined by the first ML model. For example, if the first traffic class is a resource intensive flow, then the traffic flow may be rerouted via a different or predetermined network device or path that provides higher resources (e.g., memory, processing, bandwidth, etc.) to ensure delivery of the data packets of the traffic flow to the destination address as indicated in attributes of data packets of the traffic flow. If the first traffic class is malicious, then the traffic flow may be denied or blocked from being forwarded to the destination address. Additionally, a notification including the header values of the data packets and indicating an attempt of a malware attack on the flow classification device 100 may be sent to the administration device.

Figure 3:
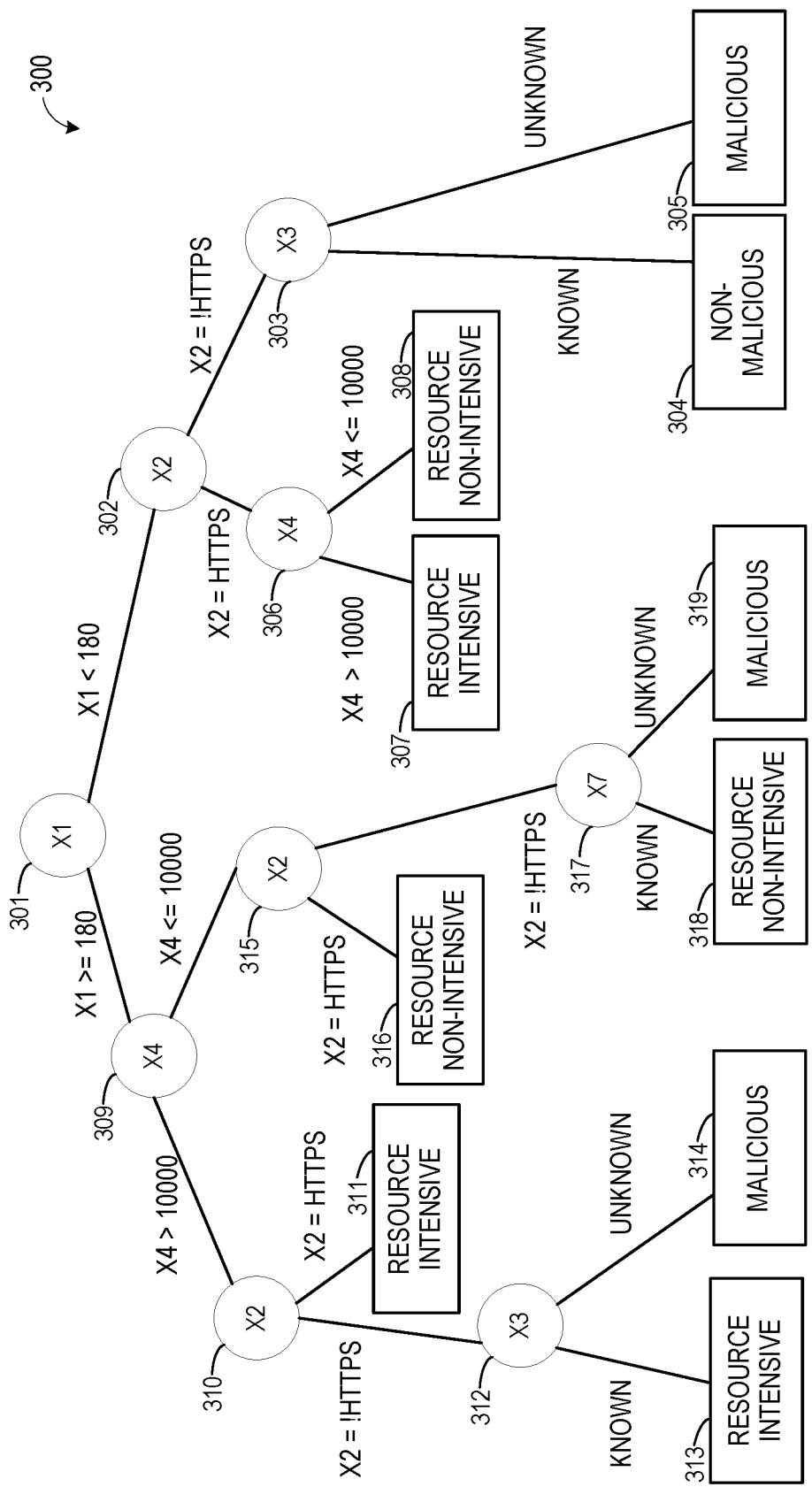
FIG. 3 is a diagram depicting a classification of traffic flows using a first ML model, in accordance with an example.

FIG. 3 is a diagram depicting a decision tree classifier implemented as the first ML model, in accordance with an example described herein.

The decision tree classifier is a supervised ML model that is structured in the form of a tree containing nodes, branches, and leaves. The nodes are represented with circles, the leaves are in rectangular boxes, and the branches are represented as lines connecting the nodes or leaves. Each node performs a "test" on an input (i.e., flow characteristic) using a classification rule. Each branch from a node represents an operation of the test, and each leaf node represents a traffic class label. The paths from a root node (topmost node) to a leaf node represent all the classification rules used by the decision tree classifier.

The decision tree method is trained using the labeled dataset, which is divided into a training dataset, a validation dataset, and a test dataset. For example, the training dataset may include flow characteristics and labels of 70% of the historical traffic flows, the validation dataset may include flow characteristics and labels of 20% of the historical traffic flows, and the test dataset may include flow characteristics and labels of 10% of the historical traffic flows. The decision tree method is trained using the training dataset to classify traffic flows based on flow characteristics of those traffic flows. The decision tree classifier is developed by checking whether the flow classifications match with the labels of the traffic flows in the labeled dataset. The decision tree classifier is fine-tuned using the validation dataset and further tested with the test dataset. Once the decision tree is trained, incoming traffic flows are classified according to the flow characteristics.

In an example operation, the decision tree classifies a given traffic flow into a traffic class using rules at each node. For example, a root node 301 determines whether a flow characteristic 'X1' (e.g., packet length) is less than or greater than or equal to a predetermined value (e.g., 180 bytes) or not, as indicated in the branches of the root node 301 ("X1<=180" or "X1<180").

If the root node 301 determines that the packet length is less than 180 bytes, then node 302 determines whether a flow characteristic 'X2' representing protocol type is HTTPS or not (labeled as "X2=HTTPS" or "X2=!HTTPS"). If the node 302 determines that the protocol type is not HTTPS (i.e., "X2=!HTTPS"), then node 303 determines whether the flow characteristic 'X3' representing service type is a known service or unknown service. If the node 303 determines that the service type is known, then the traffic flow is classified as non-malicious flow as indicated in the leaf node 304. Alternatively, if the service type is unknown, then the traffic flow is classified as malicious as indicated in the leaf node 305. If the node 302 determines that the protocol type is HTTPS (i.e., "X2=HTTPS"), then the node 306 determines whether the number of packets (represented by 'X4') is greater than or less than equal to a predetermined (e.g., 10000). If the number of packets is greater than 10000 (X4>10000), then the traffic flow is classified as resource intensive flow as indicated in the leaf node 307. Alternatively, if the number of packets is less than or equal to 10000 (X4<=10000), then the traffic flow is resource non-intensive flow as indicated in the leaf node 308.

If the root node 301 determines that the packet length is greater than or equal to 180 bytes, then the node 309 determines whether the number of packets (represented by 'X4') is greater than or less than equal to a predetermined value (e.g., 10000). If the number of packets is greater than 10000 (X4>10000), then node 310 determines whether 'X2' representing protocol type is HTTPS or not (labeled as "X2=HTTPS" or "X2=!HTTPS"). If the node 310 determines that the protocol type is HTTPS (i.e., "X2=HTTPS"), then the traffic flow is identified as resource non-intensive as indicated in the leaf node 311. If the node 310 determines that the protocol type is not HTTPS (i.e., "X2=!HTTPS"), then the node 312 determines whether the flow characteristic 'X3' representing service type is a known service or unknown service. If the node 312 determines that the service type is known, then the traffic flow is classified as resource intensive flow as indicated in the leaf node 313. Alternatively, if the service type is unknown, then the traffic flow is classified as malicious as indicated in the leaf node 314.

Alternatively, at node 309 it is determined that the number of packets is less than or equal to 10000 (X4<=10000), then node 315 determines whether a flow characteristic 'X2' representing protocol type is HTTPS or not (labeled as "X2=HTTPS" or "X2=!HTTPS"). If the node 315 determines that the protocol type is not HTTPS (i.e., "X2=!HTTPS"), then the node 317 determines whether the flow characteristic 'X3' representing service type is a known service or unknown service. If the node 317 determines that the service type is known, then the traffic flow is classified as resource non-intensive flow as indicated in the leaf node 318. Alternatively, if the service type is unknown, then the traffic flow is classified as malicious as indicated in the leaf node 319. If the node 315 determines that the protocol type is HTTPS (i.e., "X2=HTTPS"), then the traffic flow is classified as resource non-intensive flow as indicated in leaf node 316.

Figure 4:
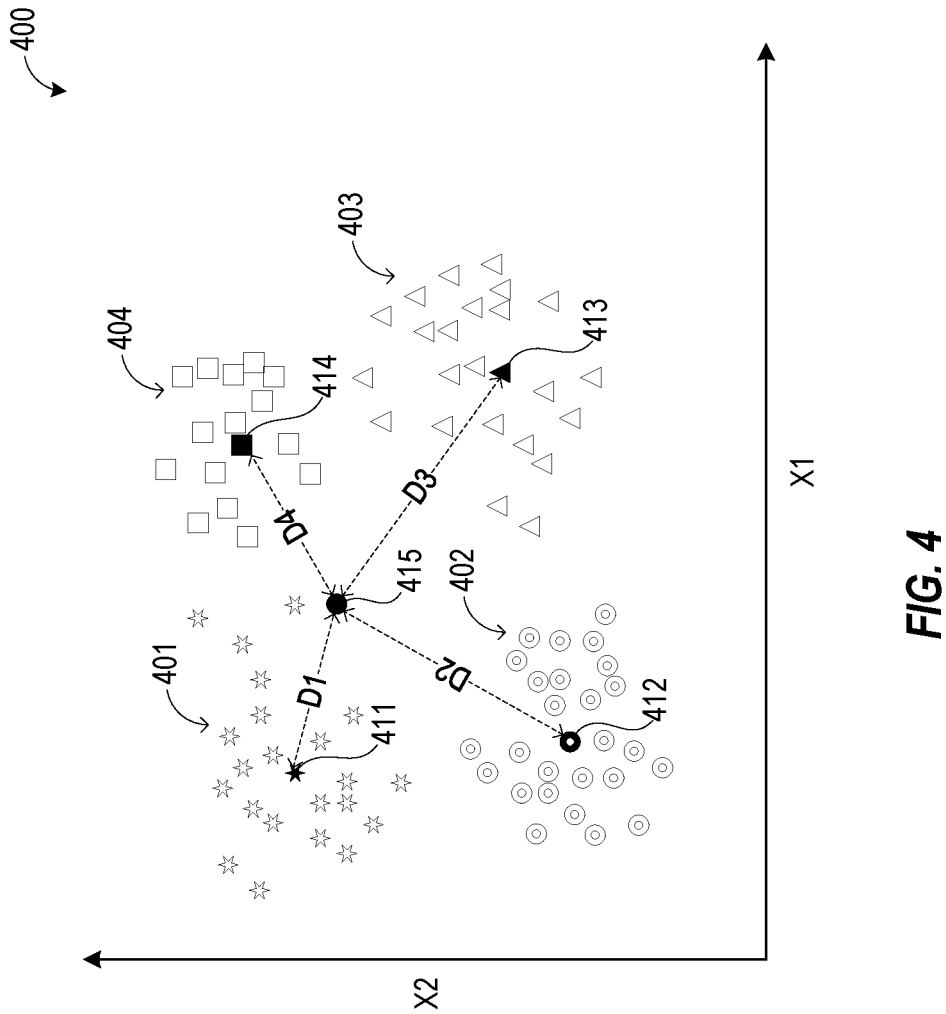
FIG. 4 is a diagram depicting a classification of traffic flows using a second ML model, in accordance with an example.

FIG. 4 is a diagram depicting a graphical representation of the classification of traffic flows, in accordance with an example described herein.

The graphical representation 400 depicts an example traffic flow classification of the labeled dataset. The graphical representation 400 is a two-dimensional representation of the traffic flow classification with an x-axis and a y-axis representing features (flow characteristics "X1" and "X2") and the symbols 401, 402, 403, and 404 representing labels (traffic classes), for example. A second ML model is trained to classify traffic flows into four traffic classes: resource intensive flows 401, resource non-intensive flows 402, non-malicious flows 403, and malicious flows 404.

A second ML method is trained to determine a second traffic class for each of the historical traffic flows based on a similarity of the traffic flows with respect to average flow characteristics of each traffic class. The second ML method may be a supervised learning method (e.g., a nearest centroid classifier) or an unsupervised learning method (e.g., clustering techniques), for example. The labeled dataset is inputted to the second ML method for training. The second ML method is trained to determine average flow characteristics (i.e., a centroid) for each traffic class in the labeled dataset. For example, the second ML method determines the mean (average) or median value of features (i.e., flow characteristics) per label (i.e., per traffic class) in the labeled dataset. Each centroid 411, 412, 413, 414 represents the average flow characteristics of the traffic flows in a traffic class. Table 1 depicts some of the average flow characteristics of each of the traffic classes.

TABLE 1

Average flow characteristics of each traffic class

| Traffic Class | Median Protocol type | Median Service type | Average Packet length (bytes) | Average Number of packets |
|---|---|---|---|---|
| Resource intensive | HTTPS | Video Streaming | 17857 | 35000 |
| Resource non-intensive | HTTPS | Email | 165 | 1160 |
| Malicious | HTTP | Unknown | 72 | 90 |
| Non-malicious | HTTPS | Chat | 196 | 823 |

As depicted in Table 1, the average flow characteristics include a median value of protocol type, a median value of service type, average packet length, and average number of packets for the traffic flows associated with each traffic class including [median protocol type, median service type, average packet length, average number of packets]. The average flow characteristics for each traffic class are included in a set of values. The set for resource intensive traffic flows includes [HTTPS, Video Streaming, 17857, 35000]; the set for resource non-intensive flows includes [HTTPS, Email, 165, 1160]; the set for malicious flows includes [HTTPS, Unknown, 72, 90]; and the set for non-malicious includes [HTTP, Chat, 196, 823].

Training the second ML method includes determining a deviation between the centroids of the traffic classes and a given traffic flow. The deviation is determined using a distance measure, such as Euclidean distance, a hamming distance, or other distance measures, for example. The second ML method is trained to determine the closest centroid with respect to the given traffic flow based on the distance measures. The traffic class that contains the closest centroid is identified as the second traffic class.

The above methods are described with an example traffic flow 415, which includes flow characteristics: protocol type: 'HTTPS', service type: video streaming, packet length: 21903 bytes, number of packets: 40972 as depicted in Table 2.

TABLE 2

Flow characteristics of a traffic flow

| Protocol type | Service type | Packet length (bytes) | Number of packets |
|---|---|---|---|
| HTTPS | Video Streaming | 21903 | 40972 |

In an example, the first ML model (e.g., the decision tree classifier 300 of FIG. 3) predicts that the first traffic class for the traffic flow 415 is resource intensive flows 401. The second ML model determines the second traffic class from the traffic classes 401, 402, 403, 404 based on a deviation or difference between the flow characteristics of the traffic flow 415 and the average flow characteristics (centroid) of each traffic class. In the graphical representation 400, the deviation is represented by the distance between the traffic flow 415 and each of the centroids 411, 412, 413, 414. The second ML model identifies the traffic class containing the centroid, from the centroids 411, 412, 413, 414, with the least deviation, i.e., nearest to the traffic flow 415.

The second ML model computes a distance between the traffic flow 415 and the centroid 411, 412, 413, 414 of each traffic class. The distances correspond to the magnitude of differences between the flow characteristics of the traffic flow 415 and the centroids 411, 412, 413, 414 of each class. The second ML model determines the distance D1 between the centroid 411 and the traffic flow 415, the distance D2 between the centroid 412 and the traffic flow 415, the distance D3 between the centroid 413 and the traffic flow 415, and the distance D4 between the centroid 414 and the traffic flow 415. Table 3 depicts the deviation between the flow characteristics of the traffic flow 415 and the centroids 411, 412, 413, 414. The deviation in protocol type and the service type is represented by a boolean value (e.g., '0' or '1'). '0' represents no difference in the protocol type or service type of the traffic flow and the centroid of the traffic class. The deviation in packet length and the number of packets is represented by the absolute difference value (i.e., disregarding whether the difference is positive or negative).

TABLE 3

Deviation between flow characteristics of a traffic flow and the average flow characteristics

| Distance | Deviation in Protocol type | Deviation in Service type | Deviation in Packet length (bytes) | Deviation in Number of packets |
|---|---|---|---|---|
| D1 | 0 | 0 | 4046 | 5972 |
| D2 | 0 | 1 | 21741 | 39812 |
| D3 | 0 | 1 | 21831 | 40882 |
| D4 | 1 | 1 | 21707 | 40149 |

The distances D1, D2, D3, D4 correspond to the deviation between the flow characteristics of the traffic flow 415 and the respective centroids 411, 412, 413, 414 of the traffic classes 401, 402, 403, 404. The second ML model determines the least distance measure among D1, D2, D3, and D4, and identifies the centroid that has the least distance from the given traffic flow. The traffic class containing the identified centroid is determined as the second traffic class. As shown in the example Table 3, the second ML model determines that D1 corresponds to the least deviation among D1, D2, D2, D4. Therefore, the second ML model identifies centroid 411 as the nearest centroid and resource intensive traffic flows 401 as the second traffic class.

In such examples, the first traffic class (resource intensive flows) predicted by the first ML model and the second traffic class (resource intensive flows) determined by the second ML model are the same. The quality metric is updated to indicate a higher frequency of matches between the first and second traffic classes. Additionally, the traffic flow may be forwarded to a destination address indicated in a metadata of the data packets in the traffic flow. In some examples, the traffic flow is forwarded to the destination address via a different route that provides higher bandwidth as the traffic flow is classified into the resource intensive flows 401.

In another example, if D4 is the least distance, then second ML model identifies centroid 414 as the nearest centroid and malicious traffic flows 404 as the second traffic class. In such examples, the first traffic class predicted by the first ML model and the second traffic class determined by the second ML model are not the same. As a result, the quality metric is updated to indicate a lower frequency of matches between the first and second traffic classes. Additionally, the traffic flow may not be forwarded to the address indicated in metadata of the data packets in the traffic flow and blocked from being rerouted to any device in the network 102. In some examples, a notification is transmitted to the administration device to alert the administrator of a potential misclassification of the traffic flow.

Figure 5:
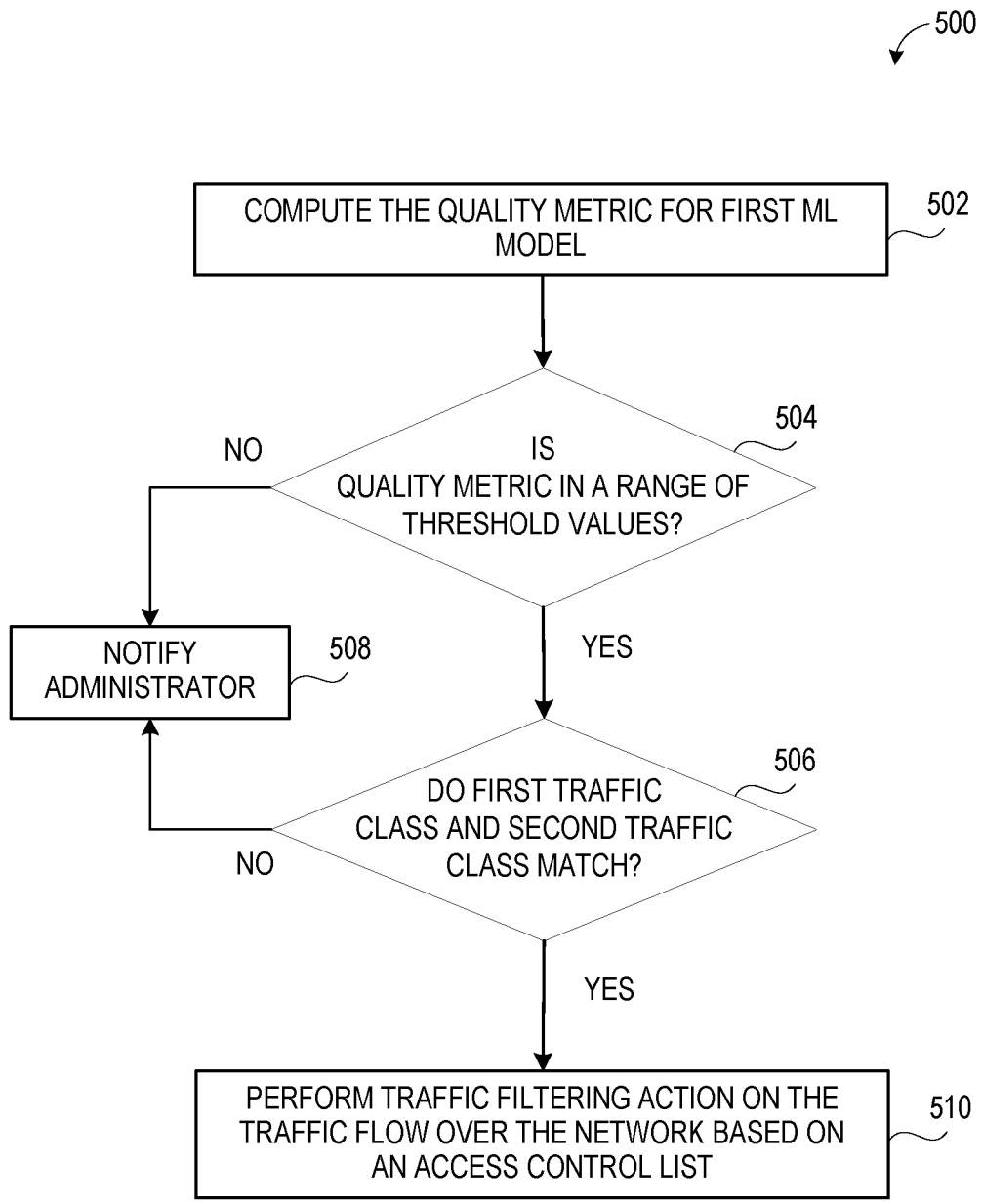
FIG. 5 is a flowchart of an example method to selectively forward traffic flows based on an access control list.

FIG. 5 is a flowchart illustrating an example method to selectively forward traffic flows based on an access control list. In some examples, method 500 may be encoded as instructions in a computer-readable medium and executed on a device (e.g., flow classification device 100) of FIG. 1.

At block 502, method 500 includes computing the quality metric for the first ML model. The quality metric indicates a frequency of matches between the first traffic class and the second traffic class. In some examples, the quality metric is updated in response to the reception and classification of a traffic flow by the first ML model and the second ML model. In other examples, the quality metric for the first ML model is computed periodically in addition to when the traffic flows are classified by the first ML model.

In some examples, the quality metric is computed based on the traffic classes predicted by the first ML model and the second ML model. For example, the quality metric may be a ratio of the frequency of the match between the traffic classifications by the first ML model and the second ML model to the total number of classifications by the first ML model and the second ML model. Alternatively, the quality metric indicates a frequency of mismatch between the first and second traffic classes. In such examples, the quality metric may be a ratio of the frequency of mismatch between the traffic classifications by the first ML model and the second ML model to the total number of classifications by the first ML model and the second ML model.

At block 504, method 500 includes evaluating the performance of the first ML model by determining whether the quality metric is in a range of threshold values. The range of threshold values includes a range of desired values that indicates a high frequency of matches between the first and second traffic classes. In response to determining that the quality metric is in a range of threshold values ("YES" at block 504), method proceeds to block 506.

At block 506, method 500 includes determining whether the first traffic class predicted by the first ML model and the second traffic class determined by the second ML model match (i.e., are the same) for the given traffic flow. In response to determining that the first and second traffic classes are the same traffic class ("YES" at block 506), method 500 proceeds to block 510.

In some examples, an administrator is notified if the quality metric decreases. For example, at block 504, in response to determining that the quality metric is not in a range of threshold values ("NO" at block 504), the method proceeds to block 508. At block 508, method 500 includes transmitting a notification to the administration device (e.g., operated by the administrator) indicating that the frequency of matches between the first and second traffic classes decreases.

In some examples, an administrator is notified if a mismatch between the first and second traffic classes is detected. For example, at block 506, in response to determining that the first traffic class and the second traffic class are not the same ("NO" at block 506), then method 500 proceeds to block 508. At block 508, a notification, which indicates that the traffic flow may be misclassified by the first ML model, is transmitted to the administration device.

At block 510, method 500 includes performing a traffic filtering action to selectively forward the traffic flow over the network based on an access control list. The access control list includes a list of rules detailing the forwarding of traffic flows in the network. In some examples, the access control list includes entries, each specifying one or more of device identities, port identities, protocols, rules, traffic class, quality metric, etc. The device identities may include IP addresses of source devices that transmit traffic flows or IP addresses of destination devices that receive the traffic flows. The port identities may include port numbers of ports in the source or destination devices. The protocols may indicate the type of protocols used by the source and destination devices. The rules indicate traffic filtering actions to be performed on the traffic flow. Examples of the traffic filtering actions may include forwarding, rerouting, blocking, prioritizing, or the like. Each rule is linked to one or more of the device identities, port identities, protocols, traffic classes, quality metrics associated with a traffic flow.

Performing a traffic filtering action involves selectively forwarding the traffic flow based on the device identities, port identities, protocols, rules, traffic class, quality metric, etc., which are indicated in the access control list. For example, the traffic flow class, the quality metric, and the device and port identities are compared with the entries of the access control list. An entry that specifies the traffic flow class, the quality metric, device, and port identities are identified. Based on the rule specified in the entry, the traffic filtering action, such as forwarding, rerouting, blocking, or the like, is performed on the traffic flow.

FIG. 6 illustrates an example access control list 600 including forwarding rules. Configuring an access control list 600 includes creating new forwarding rules (referred to herein as rules), which are recorded in separate entries of the access control list 600. The access control list 600 includes a plurality of entries, such as entries 601, 602, 603, 604, 605, 606, 607, etc. Each entry specifies quality metric 620, flag 621, traffic class 622 predicted by the first ML model, source address 623, destination address 624, and associated rules 625. In some examples, the entries include additional details, such as protocol type, source port, destination port, etc.

In the access control list 600, the quality metric 620 indicates a value of "1" or "0" depending on whether the quality metric is in a range of threshold values. For example, if the quality metric value is in the range of threshold values, then the quality metric is indicated as "1", otherwise the quality metric is indicated as "0". The flag 621 indicates "TRUE" or "FALSE" based on whether the first traffic class determined by the first ML model and the second traffic class determined by the second ML model match. For example, if the first traffic class and the second traffic class match, then the column flag 621 indicates "TRUE", otherwise the flag 621 indicates "FALSE".

The traffic class 622 indicates the first traffic class determined by the first ML model. Examples of the traffic class include resource intensive flow (labeled as "RES INTENSIVE"), resource non-intensive flow (labeled as "RES NON-INTENSIVE"), malicious flow (labeled as "MALICIOUS"), and non-malicious flow (labeled as "NON-MALICIOUS"). The source address 623 and the destination address 624 include device addresses (e.g., IP addresses) of the source and destination devices, respectively.

The rule 625 specifies the type of traffic filtering actions performed on a received traffic flow. Examples of the traffic filtering actions include permitting, rerouting, denying, prioritizing, notifying, or the like. The rules in each entry are applied when corresponding values of the quality metric 620, flag 621, traffic class 622, source address 623, and destination address 624 are satisfied. On applying the rules, the flow classification device 100 performs an associated traffic filtering action on the received traffic flow.

The entries 601, 602, 603, and 604 specify rules when the quality metric for the first ML model is in the range of threshold values (i.e., the quality metric is "1") and the classification by the first ML model and the second ML model match (i.e., flag="TRUE"). The entry 601 specifies a rule 625 to permit a traffic flow that is classified as resource non-intensive flow regardless of the source address 623 and destination address 624.

The entry 602 specifies a rule 625 to reroute a traffic flow that is classified as a resource intensive flow originating from any source address 623 and indicating a specific destination address 624 (e.g., xxx.xxx.xxx.1). For example, a destination device associated with the specific destination address (e.g., xxx.xxx.xxx.1) may not be capable of receiving traffic flows beyond a certain limit (e.g., due to low bandwidth). When the destination device is to receive the traffic flow classified as resource intensive flow, the flow classification device 100 may reroute the traffic flow to another device. Alternatively, the flow classification device 100 may pause the forwarding of the traffic flow to the destination device for a predetermined period (e.g., until sufficient bandwidth is available at the destination device). In this manner, resource intensive traffic flows are forwarded without unduly increasing resource consumption in the network based on the quality metric and the access control list 600.

The entry 603 specifies a rule 625 to deny a traffic flow that is classified as a malicious flow originating from a specific source address 623 (e.g., xxx.xxx.xxx.2) and indicating any destination address 624. For example, if a specific source device is associated with a history of malware attacks or is an untrusted device, then traffic flows originating from such a source device may be blocked or denied from being forwarded. In some examples, the rule 625 includes inspecting the data packets (e.g., using checksums, fingerprints, etc.) to verify whether the flow includes malicious requests. In this manner, the security of network devices and the network may be improved using the quality metric and the access control list 600.

The entry 604 specifies a rule 625 to prioritize a traffic flow that is classified as a non-malicious flow originating from any source address 623 and indicating any destination address 624.

The entries 605, 606, 607 specifies rules relating to instances when either the quality metric for the first ML model is not in the range of threshold values (i.e., the quality metric is "0") or the classification by the first ML model and the second ML model do not match (i.e., flag="FALSE"), or both (i.e., the quality metric is "0" and flag="FALSE"). In such instances, the rule 625 includes notifying an administrator.

For example, the entry 605 relates to an instance where the quality metric for the first ML model is in the range of threshold values (i.e., the quality metric is "1") and the classification by the first ML model and the second ML model do not match (i.e., flag="FALSE"). In such an instance, a notification indicating a mismatch of the traffic classes determined by the first and second ML models and a potential misclassification by the first ML model is transmitted to the administration device, which is operated by the administrator.

The entry 606 relates to an instance where the quality metric for the first ML model is not in the range of threshold values (i.e., the quality metric is "0") and the classification by the first ML model and the second ML model match (i.e., flag="TRUE"). In such an instance, a notification indicating a decrease in the frequency of matches between the first and second traffic class is transmitted to the administration device.

The entry 607 relates to an instance where the quality metric for the first ML model is not in the range of threshold values (i.e., the quality metric is "0") and the classification by the first ML model and the second ML model do not match (i.e., flag="FALSE"). In such an instance, a notification indicating a decrease in the frequency of matches between the first and second traffic class is transmitted to the administration device.

In some examples, the rules 625 may be created by an administrator or by an automated process based at least on values of the quality metric 620, flag 621, traffic class 622, source address 623, destination address 624, etc. For example, the entry 601 includes a rule created by an administrator to permit all traffic flows that are classified as resource non-intensive flows. In another example, the entry 603 includes a rule created by an automated process to deny traffic flows that are classified as malicious and received from a specific device having IP address XXX.XXX.XXX.2, for example.

Figure 7:
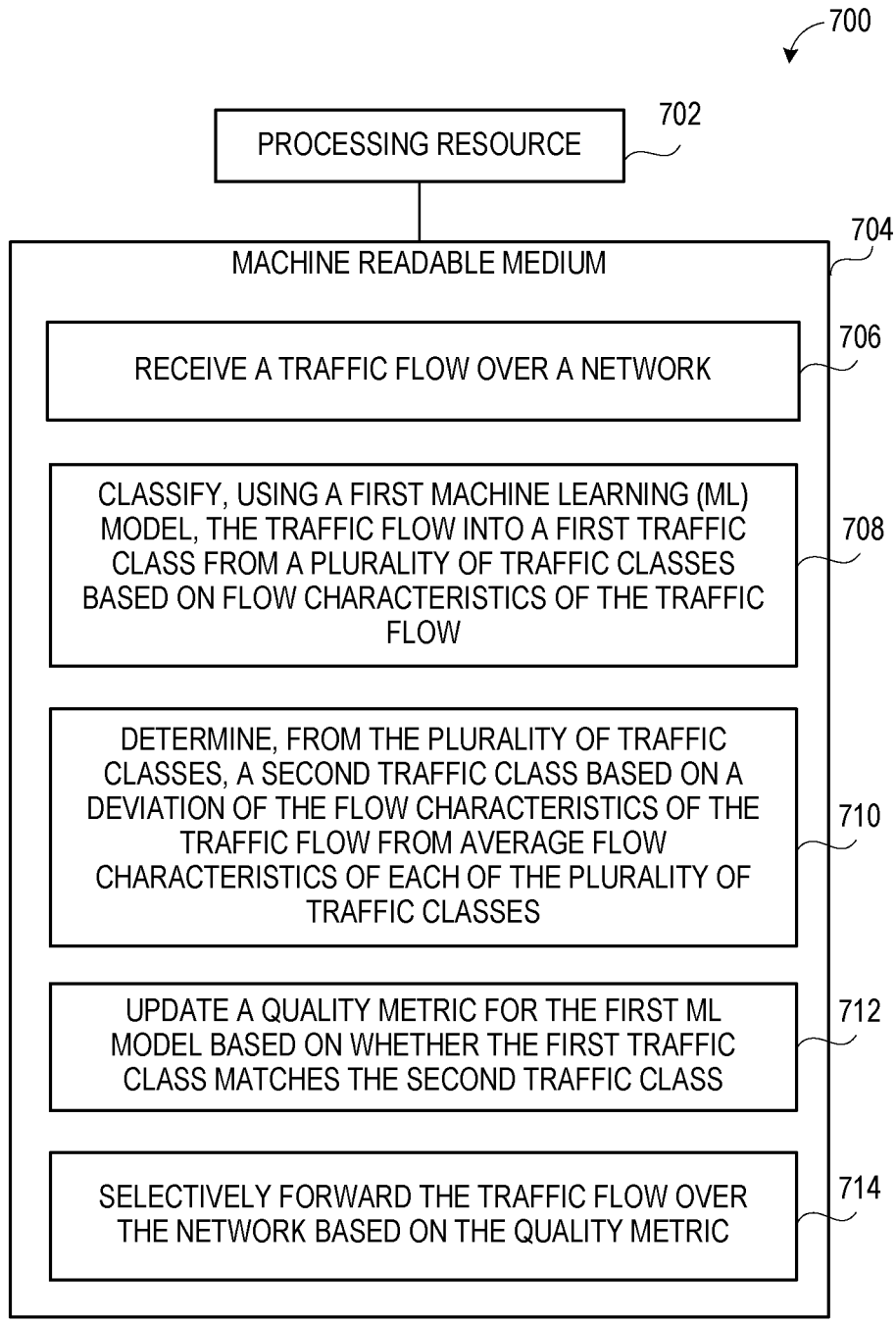
FIG. 7 is a block diagram depicting a processing resource and a machine-readable medium encoded with example instructions to selectively forward traffic flows based on traffic flow classification, in accordance with an example.

FIG. 7 is a block diagram 700 depicting a processing resource 702 and a machine-readable medium 704 encoded with example instructions to selectively forward traffic flows based on traffic flow classification. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 114 of the device 100 described in relation to FIG. 1. Further, the machine-readable medium 704 may represent one example of the machine-readable medium 116 of the device 100 described in relation to FIG. 1.

The instructions 706 when executed may cause the processing resource 702 to receive a traffic flow over a network. The instructions 708 when executed may cause the processing resource 702 to classify the traffic flow into a first traffic class from a plurality of traffic classes based on flow characteristics of the traffic flow using a first ML model. The instructions 710 when executed may cause the processing resource 702 to determine, from the plurality of traffic classes, a second traffic class containing a centroid nearest to the traffic flow. The instructions 712 when executed may cause the processing resource 702 to update a quality metric for the first ML model based on whether the first traffic class matches the second traffic class. The instructions 714 when executed may cause the processing resource 702 to selectively forward the traffic flow over the network based on the quality metric.

As used herein, the machine-readable medium may be any electronic, magnetic, optical, or other physical storage device that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CD-ROM), or the like. The machine-readable medium may be non-transitory. As described in detail herein, the machine-readable medium may be encoded with the executable instructions to perform one or more method(s), for example, method described in FIGS. 2 and 5. In the examples described above, functionalities described as being performed by "instructions" may be understood as functionalities that may be performed by those instructions when executed by the processing resource. In other examples, functionalities described in relation to instructions may be implemented by any combination of hardware and programming.

As used herein, the processing resource may be one or more physical device(s), for example, one or more central processing unit (CPU), one or more semiconductor-based microprocessors, one or more graphics processing unit (GPU), application-specific integrated circuit (ASIC), a field-programmable gate array (FPGA), other hardware devices capable of retrieving and executing instructions stored in the machine-readable medium, or combinations thereof. The processing resource may fetch, decode, and execute the instructions stored in the machine-readable medium to selectively forward traffic flows based on the quality of classifications. Further, the processing resource may also include at least one integrated circuit (IC), control logic, electronic circuits, or combinations thereof that include a number of electronic components for performing the functionalities intended to be performed by the device.

Moreover, in certain examples, where the device may be a virtual machine or a containerized application, the processing resource and the machine-readable medium may represent a processing resource and a machine-readable medium of the hardware or a computing device that hosts the device as the virtual machine or the containerized application. In some examples, the processing resource may include virtual resources provisioned through a virtual machine executing on IaaS provider server.

As used herein, a traffic flow is a sequence of data packets carrying information between two or more devices. The data packets have common properties as part of a 5-tuple or 7-tuple attributes, such as one or more of source and destination device addresses, source and destination ports, protocol type, source and destination media access control (MAC) addresses, type of service, ingression interface, quality of service (QoS), timestamps, packet length data, packet arrival time, number of packets or bytes associated with the traffic flow, etc. Flow characteristics of a traffic flow include the properties or attributes of the data packets of the traffic flow.

The flow classification device 100 of FIG. 1 may be a switch, a router, a hub, a gateway, or any network device that is capable of connecting or bridging networks or sub-networks. In some examples, the flow classification device may be implemented as a virtual machine, a service, such as a web service or a microservice coupled through an application programming interface (API). Although FIG. 1 illustrates one example device 100 capable of classifying and selectively forwarding traffic flows, other examples may have multiple such devices. In other examples, the flow classification device may be a device including a processor or microcontroller and/or any other electronic component, or a device or system that may facilitate various compute and/or data storage services. Examples of the device may include, but are not limited to, a desktop computer, a laptop, a smartphone, a server, a computer appliance, a workstation, a storage system, or a converged or hyperconverged system, and the like. The devices may have similar or varying hardware and/or software configurations in a given implementation of the networked system.

A network connects a plurality of computing systems or devices, such as, servers, computers, switches, routers, or other network devices, or the like, to each other in which the examples described above may be implemented. Examples of the network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless communication technologies. In some examples, the network may be enabled via private communication links including, but not limited to, communication links established via wireless, wired (e.g., copper), and the like. In some examples, the private communication links may be direct communication links between the device and the plurality of clients.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

I claim:

1. A non-transitory machine-readable medium comprising instructions that, when executed, cause a processing resource of a computing device to:
   receive a traffic flow over a network;
   classify, using a first machine learning (ML) model, the traffic flow into a first traffic class from a plurality of traffic classes based on flow characteristics of the traffic flow;
   determine, from the plurality of traffic classes, a second traffic class based on computing a deviation of the flow characteristics of the traffic flow from average flow characteristics of each of the plurality of traffic classes and identifying a traffic class associated with the average flow characteristics with a least deviation;
   update a quality metric for the first ML model based on whether the first traffic class matches the second traffic class, wherein the quality metric is a ratio of a frequency of a match between the first traffic class and the second traffic class ($f_{match}$) to the sum of frequencies of the match between the first traffic class and the second traffic class match, ($f_{match}$) and a mismatch between the first traffic class and the second traffic class ($f_{mismatch}$); and
   selectively forward the traffic flow over the network based on the quality metric being within a range of threshold values indicating that the first traffic class matches the second traffic class, wherein selectively forwarding includes permitting, denying, prioritizing, or rerouting the traffic flow.

2. The non-transitory machine-readable medium of claim 1, further comprising instructions to:
   in response to a determination that the quality metric is not in a range of threshold values:
   transmit, to an administration device, a notification indicative of a performance of the first ML model.

3. The non-transitory machine-readable medium of claim 1, wherein the instructions to selectively forward the traffic flow further comprising instructions to:
   in response to a determination that the quality metric is in a range of threshold values and that the first traffic class matches the second traffic class:
   forward the traffic flow to a destination device corresponding to a destination address indicated in a metadata of the traffic flow.

4. The non-transitory machine-readable medium of claim 1, wherein the instructions to selectively forward the traffic flow further comprising instructions to:
   in response to a determination that the quality metric is in a range of threshold values and that the first traffic class matches the second traffic class:
   determine, based on a metadata of the traffic flow, a source device of the traffic flow classified into the first traffic class, wherein the first traffic class is associated with non-malicious traffic flows; and
   prioritize the traffic flow received from the source device.

5. The non-transitory machine-readable medium of claim 1, wherein the instructions to selectively forward the traffic flow further comprising instructions to:
   in response to a determination that the quality metric is in a range of threshold values and that the first traffic class matches the second traffic class:
   determine, based on a metadata of the traffic flow, a source device of the traffic flow classified into the first traffic class, wherein the first traffic class is associated with resource intensive traffic flows; and
   reroute the traffic flow from the source device to a predetermined destination device with higher resource availability.

6. The non-transitory machine-readable medium of claim 1, wherein the instructions to update the quality metric further comprising instructions to:
   recompute the ratio of the frequency of the match between the first traffic class and the second traffic class ($f_{match}$) to the sum of frequencies of the match between the first traffic class and the second traffic class ($f_{match}$) and the mismatch between the first traffic class and the second traffic class ($f_{mismatch}$).

7. The non-transitory machine-readable medium of claim 1, further comprising instructions to determine the average flow characteristics of each of the plurality of traffic classes using a second ML model.

8. A device comprising:
   a processing resource; and
   a non-transitory machine-readable medium storing instructions that, when executed by the processing resource, cause the processing resource to:
   receive a traffic flow over a network;
   classify, using a first machine learning (ML) model, the traffic flow into a first traffic class from a plurality of traffic classes based on flow characteristics of the traffic flow;
   determine, from the plurality of traffic classes, a second traffic class based on computing a deviation of the flow characteristics of the traffic flow from average flow characteristics of each of the plurality of traffic classes and identifying a traffic class associated with the average flow characteristics with a least deviation;
   update a quality metric for the first ML model based on whether the first traffic class matches the second traffic class, wherein the quality metric is a ratio of a frequency of a match between the first traffic class and the second traffic class ($f_{match}$) to the sum of frequencies of the match between the first traffic class and the second traffic class match, ($f_{match}$) and a mismatch between the first traffic class and the second traffic class ($f_{mismatch}$); and
   perform a traffic filtering action on the traffic flow based on an access control list, wherein the access control list indicates rules corresponding to the quality metric being within a range of threshold values indicating a match between the first traffic class and the second traffic class and a flag indicating the match, and wherein the traffic filtering action includes permitting, denying, prioritizing, or rerouting the traffic flow.

9. The device of claim 8, wherein the processing resource executes one or more of the instructions to: create the rules to perform the traffic filtering action on the traffic flow based on the quality metric.

10. The device of claim 9, wherein the access control list includes a plurality of entries, each entry specifying the rules and one or more of the quality metric, the flag, the first traffic class, a source address, or a destination address.

11. The device of claim 9, wherein the processing resource executes one or more of the instructions to:
in response to a determination that the quality metric is in a range of threshold values and that the flag indicates that the first traffic class matches the second traffic class:
perform the traffic filtering action, wherein the traffic filtering action includes permitting the traffic flow to a destination device corresponding to a destination address indicated in a metadata of the traffic flow.

12. The device of claim 9, wherein the processing resource executes one or more of the instructions to:
in response to a determination that the quality metric is not in a range of threshold values:
perform the traffic filtering action, wherein the traffic filtering action includes notifying an administration device of a performance of the first ML model.

13. The device of claim 9, wherein the processing resource executes one or more of the instructions to:
in response to a determination that the quality metric is in a range of threshold values and that the flag indicates that the first traffic class matches the second traffic class, and wherein the first traffic class is associated with malicious traffic flows:
perform the traffic filtering action, wherein the traffic filtering action includes denying the traffic flow.

14. The device of claim 8, wherein the flow characteristics include one or more of a packet length data, packet arrival time, source Internet Protocol (IP) address, destination IP address, a source port, a destination port, an IP protocol type, type of service, quality of service (QoS), timestamps, a number of packets, or a number of bytes associated with the traffic flow.

15. A method comprising:
receiving a traffic flow over a network;
classifying, using a first machine learning (ML) model, the traffic flow into a first traffic class from a plurality of traffic classes based on flow characteristics of the traffic flow;
determining, from the plurality of traffic classes, a second traffic class based on computing a deviation of the flow characteristics of the traffic flow from average flow characteristics of each of the plurality of traffic classes and identifying a traffic class associated with the average flow characteristics with a least deviation;
updating a quality metric for the first ML model based on whether the first traffic class matches the second traffic class, wherein the quality metric is a ratio of a frequency of a match between the first traffic class and the second traffic class ($f_{match}$) to the sum of frequencies of the match between the first traffic class and the second traffic class ($f_{match}$) and a mismatch between the first traffic class and the second traffic class ($f_{mismatch}$); and
selectively forwarding the traffic flow over the network based on the quality metric being within a range of threshold values indicating that the first traffic class matches the second traffic class, wherein selectively forwarding includes permitting, denying, prioritizing, or rerouting the traffic flow.

16. The method of claim 15, further comprising determining the average flow characteristics of each of the plurality of traffic classes using a second ML model.

17. The method of claim 15, further comprising:
in response to determining that the quality metric is in a range of threshold values and that the first traffic class does not match with the second traffic class:
providing, to an administration device, a notification indicative of a potential misclassification of the traffic flow by the first ML model.

18. The method of claim 15, wherein updating the quality metric includes recomputing the ratio of the frequency of the match between the first traffic class and the second traffic class match, to ($f_{match}$) the sum of frequencies of the match between the first traffic class and the second traffic class ($f_{match}$) and the mismatch between the first traffic class and the second traffic class ($f_{mismatch}$).

* * * * *